United States Patent [19]
Lumby

[11] 3,937,792
[45] Feb. 10, 1976

[54] MANUFACTURE OF SILICON NITRIDE POWDER

[75] Inventor: Roland John Lumby, Northfield, England

[73] Assignee: Joseph Lucas (Industries) Limited, Birmingham, England

[22] Filed: Mar. 14, 1972

[21] Appl. No.: 234,624

Related U.S. Application Data
[63] Continuation-in-part of Ser. No. 55,019, July 15, 1970, abandoned.

[30] Foreign Application Priority Data
July 28, 1969 United Kingdom............... 37717/69
July 28, 1969 United Kingdom............... 37718/69

[52] U.S. Cl............................. 423/344; 23/277 R
[51] Int. Cl.² ....................................... C01B 21/06
[58] Field of Search ...... 423/344, 659; 23/277, 284; 264/56, 65, 66

[56] References Cited
UNITED STATES PATENTS

| | | | |
|---|---|---|---|
| 2,330,767 | 9/1943 | Welty, Jr. ................... | 23/288 R X |
| 2,519,481 | 8/1950 | Kubie et al. .................. | 423/362 |
| 2,788,264 | 4/1957 | Bremer et al. ................. | 23/284 |
| 3,222,438 | 12/1965 | Parr et al. .................... | 423/344 |
| 3,591,337 | 7/1971 | Lumbey ........................ | 423/344 |

FOREIGN PATENTS OR APPLICATIONS
717,555  10/1954  United Kingdom................ 423/344

*Primary Examiner*—Edward J. Meros
*Attorney, Agent, or Firm*—Holman & Stern

[57] ABSTRACT

A method of manufacturing a silicon nitride powder comprises heating a bed of silicon powder in a furnace having an atmosphere containing nitrogen so that the silicon reacts with the nitrogen to produce silicon nitride. The exothermic reaction between the silicon and the nitrogen is monitored, either by comparing the temperature in the reaction bed with the temperature at another point in the furnace, or by allowing the nitrogen containing atmosphere to flow through the furnace and measuring the rates of flow of the atmosphere into and out of the furnace. The partial pressure of the nitrogen in the furnace atmosphere is then controlled in accordance with the exothermic reaction so as to ensure that the temperature in the bed does not exceed a predetermined value above which β-phase silicon nitride is formed, the partial pressure of the nitrogen in the furnace being controlled by effecting at least one of the steps of:

a. diluting the nitrogen in the furnace atmosphere and, b. evacuating the furnace.

6 Claims, 1 Drawing Figure

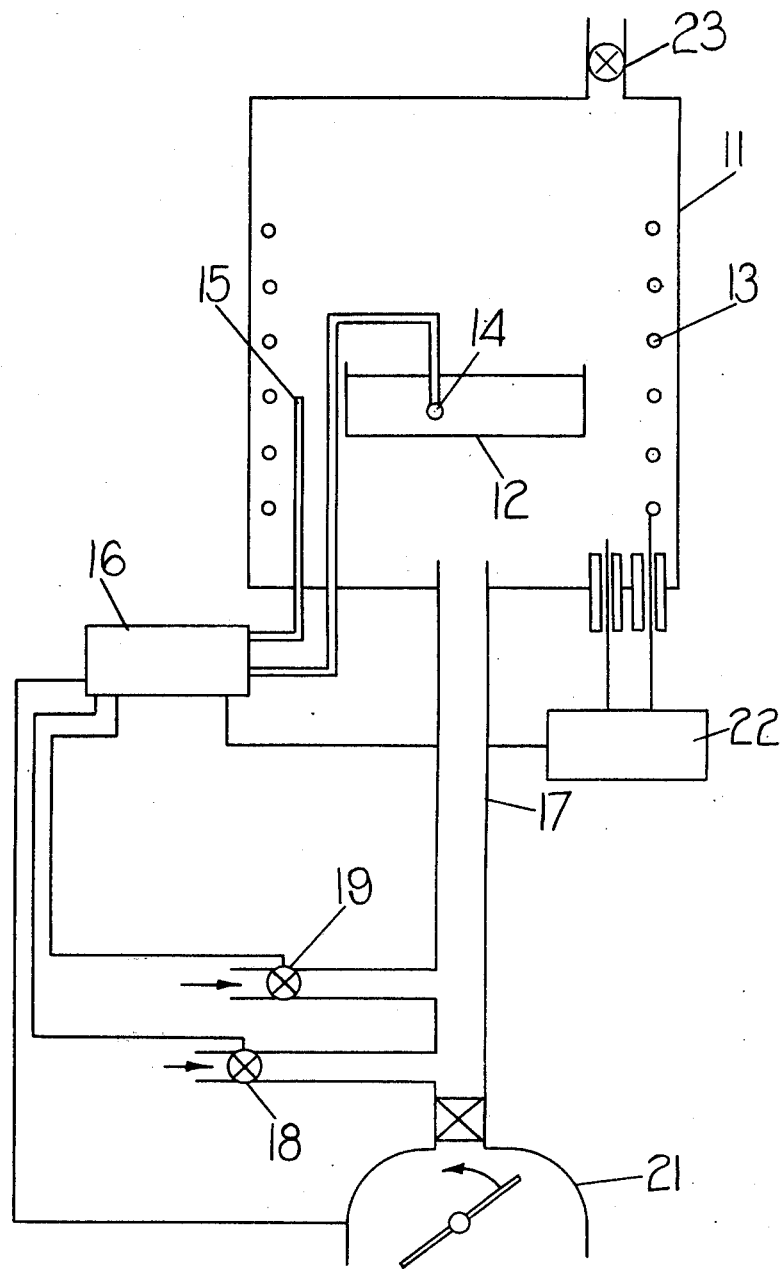

MANUFACTURE OF SILICON NITRIDE POWDER

This invention relates to silicon nitride products and is a continuation-in-part of my Application Ser. No. 55,019 filed July 15, 1970 and now abandoned.

In the manufacture of silicon nitride products from silicon nitride powder by hot pressing the powder, improved properties are obtained if the presence of the powder in the $\beta$-phase is eliminated, or reduced to a very low level. The proportion of $\beta$-phase powder that can be tolerated depends upon the intended use of the product to be formed from the powder, so that in some cases as much as 15% $\beta$-phase powder may be acceptable.

Silicon nitride powder can be manufactured by heating silicon in an atmosphere containing nitrogen, and providing a predetermined temperature is not exceeded, the powder will be entirely in its $\alpha$-phase. This predetermined temperature is in the region of between 1300° and 1400°C, but it is sometimes very difficult to maintain the reaction temperature below this value, because the reaction is exothermic. Of course, if the reaction temperature is allowed to rise above the predetermined temperature, then an appreciable amount of the $\beta$-phase material results in the silicon nitride powder produced. The object of this invention is to provide a method which minimises this disadvantage.

A method, according to one aspect of the invention, comprises heating a bed of silicon powder in a furnace having an atmosphere including nitrogen, sensing the temperature in the bed and comparing it with a temperature at another point in the furnace, and controlling the partial pressure of the nitrogen in the furnace atmosphere in accordance with the difference between the temperature so as to ensure that the temperatures in the bed does not exceed a predetermined value above which $\beta$-phase silicon nitride is formed, the partial pressure of the nitrogen in the furnace being controlled by effecting at least one of the steps of:

a. diluting the nitrogen in the furnace atmosphere, and
b. evacuating the furnace.

A method, according to a further aspect of the invention, comprises heating a bed of silicon powder in a furnace and simultaneously passing through the furnace a nitrogen containing gas, monitoring the conditions within the furnace by measuring the rates of flow of gas into and out of the furnace and controlling the partial pressure of the nitrogen in the furnace atmosphere in accordance with the difference between the flow rates so as to ensure that the temperature in the bed does not exceed a predetermined value above which $\beta$-phase silicon nitride is formed, the partial pressure of the nitrogen in the furnace being controlled by effecting at least one of the steps of:

a. diluting the nitrogen in the furnace atmosphere, and
b. evacuating the furnace.

The addition of $\alpha$-phase silicon nitride powder to the silicon powder to be placed in the furnace bed is also found to facilitate control of the nitriding of the silicon powder. Preferably, more than 5% by weight of silicon nitride powder is present in the reaction bed. Also, where silicon nitride powder is added to the reaction bed it is generally found to be desirable to ensure that the tap density of the mixture is of the order of 0.7 grams per c.c. In this respect, it is to be understood that the tap density of a powder is the density measured after the powder is tapped to compact it slightly.

The accompanying drawing illustrated diagrammatically one example of apparatus for carrying out the method of the invention.

Referring to the drawing, the apparatus includes a furnace 11 within which is positioned a bed 12 which contains the silicon powder to be nitrided. The furnace includes a heater 13, and a thermocouple 14 within the bed 12. A further thermocouple 15 is contained within the furnace just outside the bed 12 and the thermocouples 14 and 15 are connected to a control circuit 16. The interior of the furnace 11 is connected to an inlet pipe 17 into which a nitrogen/hydrogen mixture can be introduced under the control of a valve 18. A gas which is inert to the reaction, for example, argon, can also be introduced into the pipe 17 through a valve 19, and the interior of the furnace can be evacuated upon operation of a vacuum pump 21. The control circuit 16 controls the valves 18 and 19 and pump 21, and can also control a circuit 22 which supplies current to the heater 13. The supply of current to the heater 13 can be made to follow a predetermined schedule, for example by a cam control system. The furnace also includes a gas outlet valve 23.

During manufacture of silicon nitride powder, the bed 12 is heated in an atmosphere of nitrogen together with hydrogen and, conveniently, the atmosphere supplied to the furnace is forming gas, that is 90% nitrogen and 10% hydrogen. It is to be appreciated that although the silicon can be heated in the presence of nitrogen alone, this in general is not preferred since it is found to result in a reduction in the $\alpha$-phase content of the silicon nitride produced. During heating, as the temperature of the furnace increases towards the required nitriding temperature the valve 18 is arranged to be open to allow flow of nitrogen and hydrogen into the furnace while the valve 19 is closed and the pump 21 is off. The circuit 16 senses the difference in temperature between the thermocouples 14, 15 and, because the thermocouple 15 is nearer the heater 13, during the period that the furnace is heating up, the temperature of the thermocouple 15 will exceed that of the thermocouple 14. Provided this relationship is maintained, the control circuit 16 is arranged to have no effect on the system, and the furnace is heated and maintained at the required nitriding temperature, which preferably is between 1150°C and 1300°C, so that the reaction to produce substantially $\alpha$-phase silicon nitride powder proceeds smoothly. However, because the reaction is exothermic, as soon as nitriding begins, there will be a rise in temperature within the bed 12, so that the temperature of the thermocouple 14 will approach, and then increase beyond, that of the thermocouple 15. The control circuit 16 is then arranged to decrease the nitrogen partial pressure in the furnace so as to slow down the nitriding reaction and thereby halt the increase in temperature of the reaction bed. Conveniently, if the temperature of the thermocouple 14 exceeds that of the thermocouple 15 by 100°C, then the circuit 16 operates to dilute the nitrogen in the furnace, either by stopping or slowing down the flow of forming gas through the valve 18 or by opening the valve 19 to introduce the inert gas. Alternatively, the control circuit 16 can be arranged to evacuate the interior of the furnace through the pump 21 when the temperature of the thermocouple 14 exceeds that of the thermocouple 15 and then to refill the furnace through the valves 18, 19 when the temperature of the thermocouple 14 falls. Further, if the control circuit 16 is arranged to dilute the forming gas in the furnace atmosphere when exotherming occurs, but the exotherming is so extreme that the dilution does not control the reaction, the circuit 16 is then arranged to operate the pump 21 to evacuate the furnace. Further, the circuit 16 can be arranged to either reduce or remove the supply of heat from the heater to the furnace when exotherming occurs. However, once exotherming is established it is no longer possible to control the amount of exotherming by heater control alone unless small laboratory quantities of silicon, in the order of 1 gm, are being nitrided. However, it may be desirable to reduce or remove the supply of heat to the furnace in order to reduce reaction time.

As an alternative to the apparatus described above, the conditions within the furnace can be monitored by measuring with flow meters the rate of flow of nitrogen containing gas into and out of the furnace through the valves 18, 23 respectively and by controlling the amount of nitrogen available from the difference between the two flow rates. This method relies on the fact that when exotherming occurs, the nitrogen required for reaction with silicon increases suddenly, as well as the temperature.

As a further alternative, a single, three-way valve can be used to supply the nitrogen and the insert gas to the furnace, instead of the separate valves 18, 19 in the apparatus described above. The method of the invention will now be illustrated by reference to the following examples:

EXAMPLE 1

A bed of 500 grams of a mixture of silicon powder and 10% by weight of $\alpha$-phase silicon nitride powder was first prepared. The silicon powder used was that sold by Dunstan and Wragg Limited as type $3\mu$ which, as supplied, was found to consist of 90% of particles of size less than 8 microns. With the powder bed in position in the furnace, the temperature of the furnace was raised to 1150°C with the valve 18 open to supply a forming gas atmosphere to the furnace and the valve 19 closed. The conditions within the furnace were monitored by means of the thermocouples 14, 15 and when the reaction began to proceed rapidly so that the temperature of the thermocouple 14 exceeded that of the thermocouple 15, the valves 18, 23 were closed to seal the chamber. When the reaction subsided, valve 18 was opened to bring the pressure in the furnace up to atmospheric, and then the valve 23 was opened. When the reaction again began to proceed rapidly this sequence was repeated and it was found to be possible in this way to control the temperature of the silicon powder bed at 1365°C. This temperature was found to be convenient since it provided a reasonably fast reaction rate and was below the melting point of the silicon powder bed, that is temperature at which the silicon would have formed a molten pool and subsequent nitriding would have been inhibited. By controlling the temperature at 1365° C, the reaction proceeded to completion in six hours and the resultant silicon nitride powder contained 92.5% of the $\alpha$-phase material.

By way of contrast, a similar powder bed was prepared and was heated in a large laboratory furnace to 1275°C without the flow of forming gas into the furnace being controlled. In this case, the silicon powder reacted so rapidly with the nitriding atmosphere that the temperature of the silicon bed rose to 1625°C and produced a silicon nitride powder containing 45% of $\beta$-phase silicon nitride in five minutes.

EXAMPLE 2

The procedure of example 1 was followed, but at the commencement of exotherming as determined by the temperature difference detected by thermocouples 14 and 15, the heat supply to the heaters 13 was reduced so that the furnace temperature was lowered from 1150°C to 1000°C. The overall reaction time was reduced from 6 hours to 5 hours.

It will be appreciated that as the heat supply is reduced, the temperature differential for controlling the opening and closing of the gas valve must be increased, in order to maintain the exotherming level at 1365°C.

EXAMPLE 3

A procedure similar to example 1 was again followed, but in this case $\alpha$-phase silicon nitride was not added to the silicon powder bed and the control circuit 16 controlled the reaction within the furnace 11 by alternately evacuating the furnace through the pump 21 and then refilling the furnace with a forming gas atmosphere. In this way the temperature of the silicon bed was maintained at 1365°C and once again a powder high in $\alpha$-phase silicon nitride was produced in six hours.

EXAMPLE 4

Again a similar procedure to example 1 was followed, but now the conditions within the furnace were controlled by varying the rate of flow of forming gas into the furnace through the valve 18. This method was found to give adequate control since when the flow rate of the gas was low, the large amounts of nitrogen required for reaction with the silicon caused the partial pressure of the nitrogen to decrease and hence the rate of nitriding reaction to decrease also. When the normal flow rate of forming gas into the furnace was 50 liters per hour, this value of course being decreased whenever exotherming began, it was found to be possible, using this method of control, to maintain the temperature of the silicon powder bed at 1365°C until the reaction to produce a high $\alpha$-phase silicon nitride powder was complete.

EXAMPLE 5

A 12 kilogram sample of the silicon powder used in the previous examples together with 15% by weight of silicon nitride powder was prepared and positioned in the reaction bed of a furnace. The furnace atmosphere was controlled by means of a three-way proportioning valve, the two inlets to the valve supplying forming gas and argon respectively. The conditions within the furnace were monitored by means of thermocouples in the reaction bed and adjacent the heater in the furnace, the difference in temperature values between these thermocouples being used to operate an electric motor controlling the proportions of forming gas and argon respectively allowed through the valve. The temperature of the furnace was raised and when the silicon bed had attained a temperature of 1100°C a strongly exothermic reaction began. By altering the relative proportions of forming gas and argon flowing into the furnace and thereby the partial pressure of nitrogen within the furnace, the bed temperature was conveniently held at 1320°C to effect the nitriding reaction. When the reaction was almost complete as indicated by the temperature of the thermocouple in the reaction bed falling to the same value as that adjacent the furnace heater, the heater was used to raise the temperature of the furnace to 1300°C. This additional raising of the furnace temperature was found to be necessary with large silicon powder batches and was to promote reaction of the silicon in the outer regions of the bed, since otherwise the reaction tended to occur only in the central regions of the bed which would have resulted in some of the powder remaining unreacted. When this additional heating was effected, the temperature of the thermocouple in the reaction bed again exceeded that of the thermocouple adjacent the heater and control of this final nitriding reaction was again effected by varying the proportions of the gases flowing through the proportioning valve. The reaction was complete after forty-eight hours and resultant powder was found to contain 89% of α-phase silicon nitride with very little unreacted silicon.

EXAMPLE 6

500 grams of silicon powder of mean particle size in the order of 2 microns was mixed with 125 grams of 90% α-phase silicon nitride of mean particle size in the order of 10 microns. The mixture was loaded into a reaction boat such that the tap density of the mixture was 0.65 gm/c.c. The boat was then positioned in the furnace 11 and the temperature of the furnace was raised at 400°C per hour while forming gas containing 90% nitrogen and 10% hydrogen was passed through the furnace by way of the valves 18, 23. Flow meters (not shown) were used to measure the rate of gas flow into and out of the furnace and the valves 18, 23 were controlled so that, during heating up of the furnace, the flow rates into and out of the furnace were equal and, conveniently, were 40 liters per hour. The temperature of the furnace 11 was raised until a value of 1150°C was reached, at which temperature an exothermic reaction between the nitrogen and the silicon commenced so that, owing to the nitrogen being consumed in the reaction, the rate of flow of gas into the furnace began to exceed the rate of flow of gas out of the furnace. The flow meters were arranged to be of the differential thermal conductivity type and hence provided a voltage output proportional to the gas flow being measured. The output stages of the flow meters were then connected in series opposition so that, in response to differences between the gas flow rates measured by the flow meters, a control signal was obtained dependent upon this difference. This control signal was then arranged to control operation of the valve 19 so that when the flow of gas out of the furnace fell below the rate of flow of gas into the furnace, which as previously stated indicated exotherming, gas inert to the nitriding reaction was supplied to the furnace through the valve 19. In addition, the control signal was arranged to shut off the forming gas supplied through the valve 18 when exotherming occurred. With the valve 19 open and the valve 18 closed, the reaction died away until once again the flow of gas into the furnace became equal to the flow of gas out of the furnace. At this stage, the control signal from the flow meters disappeared which was arranged to cause the valve 19 to close and the valve 18 to open so that the reaction between the silicon and the nitrogen recommenced. When exotherming reoccurred, the flow of gas into the furnace once again exceeded the flow of gas out of the furnace so that the control signal again opened the valve 19 and closed the valve 18 to quench the reaction. This process continued until the reaction was completed when, of course, the rate of flow of gas into the furnace was equal to the rate of flow of gas out of the furnace even with the valve 18 open. Finally, the furnace temperature was raised to 1350°C for 4 hours to ensure that conversion of the silicon powder to the silicon nitride was complete. The resulting silicon nitride powder was found to consist almost entirely of α-phase material.

It is to be appreciated that in this example, the flow meters replace the differential thermocouples 14, 15, although it is, of course, necessary to provide a thermocouple for detecting the furnace temperature.

I claim:

1. A method of manufacturing a silicon nitride powder comprising heating a bed containing silicon powder in a furnace having an atmosphere including nitrogen, sensing the temperature in the bed and comparing said temperature with a further temperature at another point in the furnace outside said bed, and controlling the partial pressure of the nitrogen in the furnace atmosphere in accordance with the difference between said temperatures so as to ensure that the temperature in the bed does not exceed a predetermined value above which β-phase silicon nitride is formed, the partial pressure of the nitrogen in the furnace being controlled by effecting at least one of the steps of:
  a. diluting the nitrogen in the furnace atmosphere and,
  b. evacuating the furnace.

2. A method as claimed in claim 1, wherein the bed comprises a mixture of silicon powder and α-phase silicon nitride powder.

3. A method as claimed in claim 2 wherein the mixture of silicon powder and α-phase silicon nitride powder in the bed is arranged to have a tap density of the order of 0.7 grams per c.c.

4. A method as claimed in claim 2 wherein more than 5% by weight of α-phase silicon nitride is present in the mixture.

5. A method as claimed in claim 1 wherein the temperature of the silicon bed and the temperature at the point in the furnace spaced from the bed are sensed by a pair of thermocouples respectively.

6. A method of manufacturing a silicon nitride powder comprising heating a bed containing silicon powder in a furnace having an atmosphere including nitrogen, sensing the temperature in the bed and comparing said temperature with a further temperature at another point in the furnace outside said bed, and controlling the partial pressure of the nitrogen in the furnace atmosphere in accordance with the difference between said temperatures so as to ensure that the temperature in the bed does not exceed a predetermined value above which β-phase silicon nitride is formed, the partial pressure of the nitrogen in the furnace being controlled by diluting the nitrogen in the furnace atmosphere.

* * * * *